(12) United States Patent
Johnson et al.

(10) Patent No.: US 10,508,645 B2
(45) Date of Patent: Dec. 17, 2019

(54) SYSTEM AND METHOD FOR SUSPENDING A ROTOR BLADE OF A WIND TURBINE UPTOWER

(71) Applicant: General Electric Company, Schenectady, NY (US)

(72) Inventors: Don Conrad Johnson, Simpsonville, SC (US); Daniel Leroy Olson, New Berlin, WI (US); Adam Sean Davis, Red Feather Lakes, CO (US)

(73) Assignee: General Electric Company, Schenectady, NY (US)

( * ) Notice: Subject to any disclaimer, the term of this patent is extended or adjusted under 35 U.S.C. 154(b) by 101 days.

(21) Appl. No.: 15/651,109

(22) Filed: Jul. 17, 2017

(65) Prior Publication Data

US 2019/0017495 A1    Jan. 17, 2019

(51) Int. Cl.
*F03D 13/40* (2016.01)
*F03D 80/50* (2016.01)
*F03D 1/06* (2006.01)

(52) U.S. Cl.
CPC ........... *F03D 13/40* (2016.05); *F03D 1/0658* (2013.01); *F03D 80/50* (2016.05);
(Continued)

(58) Field of Classification Search
CPC .............. F05B 2230/70; F05B 2230/80; F05B 2230/61; F05B 2240/913; F05B 2240/916;
(Continued)

(56) References Cited

U.S. PATENT DOCUMENTS 7,353,603 B2   4/2008   Wobben
7,735,290 B2   6/2010   Arsene
(Continued)

FOREIGN PATENT DOCUMENTS

CA        2692705       8/2010
DK     201400575 A1     4/2016
(Continued)

OTHER PUBLICATIONS

Extended European Search Report and Opinion issued in connection with corresponding EP Application No. 18183699.0 dated Dec. 10, 2018.

*Primary Examiner* — Christopher J Besler
(74) *Attorney, Agent, or Firm* — Dority & Manning, P.A.

(57) ABSTRACT

A method for suspending a rotor blade uptower includes mounting a first end of a support structure at a first uptower location of the wind turbine. The method also includes securing the rotor blade to a second end of the support structure. Further, the method includes mounting at least one pulley block assembly between a second uptower location and the support structure. Moreover, the method includes routing at least one pulley cable from at least one winch over the at least one pulley block assembly. In addition, the method includes detaching the rotor blade from the hub of the wind turbine. Once the rotor blade is detached, the method includes rotating the support structure about the first end via coordinated winch operation so as to lower the rotor blade a predetermined distance away from the hub. Thus, the method also includes suspending the rotor blade at the predetermined distance away from the hub via the support structure.

8 Claims, 12 Drawing Sheets

(52) U.S. Cl.
CPC ....... *F05B 2230/61* (2013.01); *F05B 2230/70* (2013.01); *F05B 2230/80* (2013.01); *F05B 2240/913* (2013.01); *F05B 2240/916* (2013.01); *F05B 2240/917* (2013.01)

(58) Field of Classification Search
CPC .... F05B 2240/917; F03D 13/40; F03D 80/50; F03D 1/0658
See application file for complete search history.

(56) References Cited

U.S. PATENT DOCUMENTS

| | | | |
|---|---|---|---|
| 7,785,073 | B2 | 8/2010 | Wobben |
| 7,832,101 | B2 | 11/2010 | Koesters |
| 7,877,934 | B2 | 2/2011 | Livingston et al. |
| 8,033,791 | B1 | 10/2011 | Watanabe |
| 8,052,396 | B2 | 11/2011 | Wobben |
| 8,069,634 | B2 | 12/2011 | Livingston et al. |
| 8,083,212 | B2 | 12/2011 | Numajiri et al. |
| 8,118,552 | B2 | 2/2012 | Nies |
| 8,191,253 | B2 | 6/2012 | Vangsy |
| 8,240,962 | B2 | 8/2012 | Livingston et al. |
| 8,360,398 | B2 | 1/2013 | Diaz De Corcuera et al. |
| 8,528,735 | B2 | 9/2013 | Nies |
| 8,562,302 | B2 | 10/2013 | Bakhuis et al. |
| 8,584,355 | B2 | 11/2013 | Holling |
| 8,595,931 | B2 | 12/2013 | Riddell et al. |
| 8,602,700 | B2 | 12/2013 | Johnson |
| 8,651,462 | B2 | 2/2014 | Van Berlo et al. |
| 9,617,981 | B2 | 4/2017 | Hancock |
| 9,651,021 | B2 | 5/2017 | Neumann et al. |
| 2007/0266538 | A1 | 11/2007 | Bervang |
| 2007/0290426 | A1 | 12/2007 | Trede et al. |
| 2009/0167023 | A1 | 7/2009 | Nies |
| 2010/0018055 | A1 | 1/2010 | Fomsgaard et al. |
| 2010/0028152 | A1 | 2/2010 | Tomohro et al. |
| 2010/0135797 | A1 | 6/2010 | Nies |
| 2010/0139062 | A1 | 6/2010 | Reed et al. |
| 2010/0254813 | A1 | 10/2010 | Dawson et al. |
| 2011/0142636 | A1 | 6/2011 | Curtin |
| 2012/0027561 | A1 | 2/2012 | Riddell et al. |
| 2012/0076663 | A1 | 3/2012 | From |
| 2012/0137481 | A1 | 6/2012 | Lindberg et al. |
| 2012/0217089 | A1 | 8/2012 | Fenger |
| 2013/0025113 | A1 | 1/2013 | Arocena De La Rua et al. |
| 2013/0074335 | A1 | 3/2013 | Amano |
| 2013/0098859 | A1 | 4/2013 | See et al. |
| 2013/0236316 | A1 | 9/2013 | Bitsch et al. |
| 2013/0236324 | A1 | 9/2013 | Bech et al. |
| 2013/0318789 | A1 | 12/2013 | Gabeiras et al. |
| 2014/0010658 | A1 | 1/2014 | Nielsen |
| 2014/0010661 | A1 | 1/2014 | Hancock |
| 2015/0048043 | A1 | 2/2015 | Laurens et al. |
| 2015/0226179 | A1 | 8/2015 | Neumann et al. |
| 2016/0327017 | A1 | 11/2016 | Neumann et al. |

FOREIGN PATENT DOCUMENTS

| | | | | |
|---|---|---|---|---|
| EP | 2345811 | B1 | 10/2012 | |
| EP | 2369174 | B1 | 11/2012 | |
| EP | 2616670 | A1 | 7/2013 | |
| GB | 2483677 | A * | 3/2012 | ........... F03D 1/0658 |
| JP | 2006152862 | A | 6/2006 | |
| WO | WO2010/147480 | A1 | 12/2010 | |
| WO | WO2011/064659 | A2 | 6/2011 | |
| WO | WO2011/095167 | A2 | 8/2011 | |
| WO | WO2012/065613 | A1 | 5/2012 | |

* cited by examiner

SYSTEM AND METHOD FOR SUSPENDING A ROTOR BLADE OF A WIND TURBINE UPTOWER

FIELD OF THE INVENTION

The present disclosure relates generally to wind turbines, and more particularly to systems and methods for suspending a rotor blade of a wind turbine uptower.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Further, each of the rotor blades are configured to rotate about a pitch axis via a pitch bearing mounted between the rotor blade and the hub. If one of the pitch bearings becomes damaged and needs to be replaced and/or repaired, a large crane must be transported to the wind turbine site in order to provide a means for raising and/or lowering the associated rotor blade relative to the hub. Operation of such cranes is complex and the process for raising and/or lowering the rotor blades using such cranes is time-consuming and labor intensive.

Accordingly, improved methods and related systems for suspending a rotor blade of a wind turbine uptower while the pitch bearing is repaired or replaced that addresses the aforementioned issues would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for suspending a rotor blade uptower. The method includes mounting a first end of a support structure at a first uptower location of the wind turbine. The method also includes securing the rotor blade to a second end of the support structure. Further, the method includes mounting at least one pulley block assembly between a second uptower location and the support structure. Moreover, the method includes routing at least one pulley cable from at least one winch over the at least one pulley block assembly. In addition, the method includes detaching the rotor blade from the hub of the wind turbine. Once the rotor blade is detached, the method includes rotating the support structure about the first end via coordinated winch operation so as to lower the rotor blade a predetermined distance away from the hub. Thus, the method also includes suspending the rotor blade at the predetermined distance away from the hub via the support structure.

In one embodiment, the method may include positioning the rotor blade toward a ground location in a substantially six o'clock position. In another embodiment, the method may also include detaching the rotor blade from the hub of the wind turbine with a pitch bearing attached thereto.

In further embodiments, the method may include securing the rotor blade to the second end of the support structure via one or more clamp members.

In several embodiments, the first and second uptower locations may be located on a bedplate and/or a nacelle of the wind turbine. In such embodiments, the method may include mounting the first end of the support structure to the bedplate at a hinge point and rotating the support structure about the hinge point via coordinated winch operation so as to lower the rotor blade the predetermined distance away from the hub.

In additional embodiments, the support structure may include, at least, a first support structure arm and a second support structure arm. In such embodiments, the method may include mounting first ends of the first and second support structure arms to opposing sides of the bedplate.

In particular embodiments, the pulley block assembly(ies) may include at least one first pulley block mounted on the bedplate of the wind turbine and at least one second pulley block mounted to the support structure. More specifically, in one embodiment, the method may include providing first and second pulley block assemblies on opposing sides of the bedplate. For example, in several embodiments, the first and second pulley block assemblies may include at least one first pulley block mounted at the second uptower location of the wind turbine and at least one second pulley block mounted to the first and second support structure arms.

In further embodiments, the step of rotating the support structure about the first uptower location via coordinated winch operation so as to lower the rotor blade the predetermined distance away from the hub may include lowering the rotor blade from a first position at the hub to a second position that is closer to a tower of the wind turbine than the first position. In additional embodiments, the method may include securing the rotor blade to the tower of the wind turbine at a blade root and a blade tip of the rotor blade during suspension thereof via at least one of a clamp member, a sleeve, one or more support lines, or combinations thereof.

In another aspect, the present disclosure is directed to a system for suspending a rotor blade uptower. The system includes a support structure having a first end and a second end. The first end includes a hinge point for securing to a first uptower location of the wind turbine. The second end is configured to receive and secure the rotor blade thereto. The system further includes at least one pulley block assembly mounted between the first uptower location and the support structure. Moreover, the system includes at least one winch and at least one pulley cable routed from at least one winch over the at least one pulley block assembly. Thus, the support structure is configured to rotate about the hinge point via coordinated winch operation so as to lower the rotor blade a predetermined distance away from a hub of the wind turbine and suspend the rotor blade at the predetermined distance away from the hub.

In one embodiment, the second end of the support structure may include one or more clamp members configured to receive and secure the rotor blade therein. It should be further understood that the system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
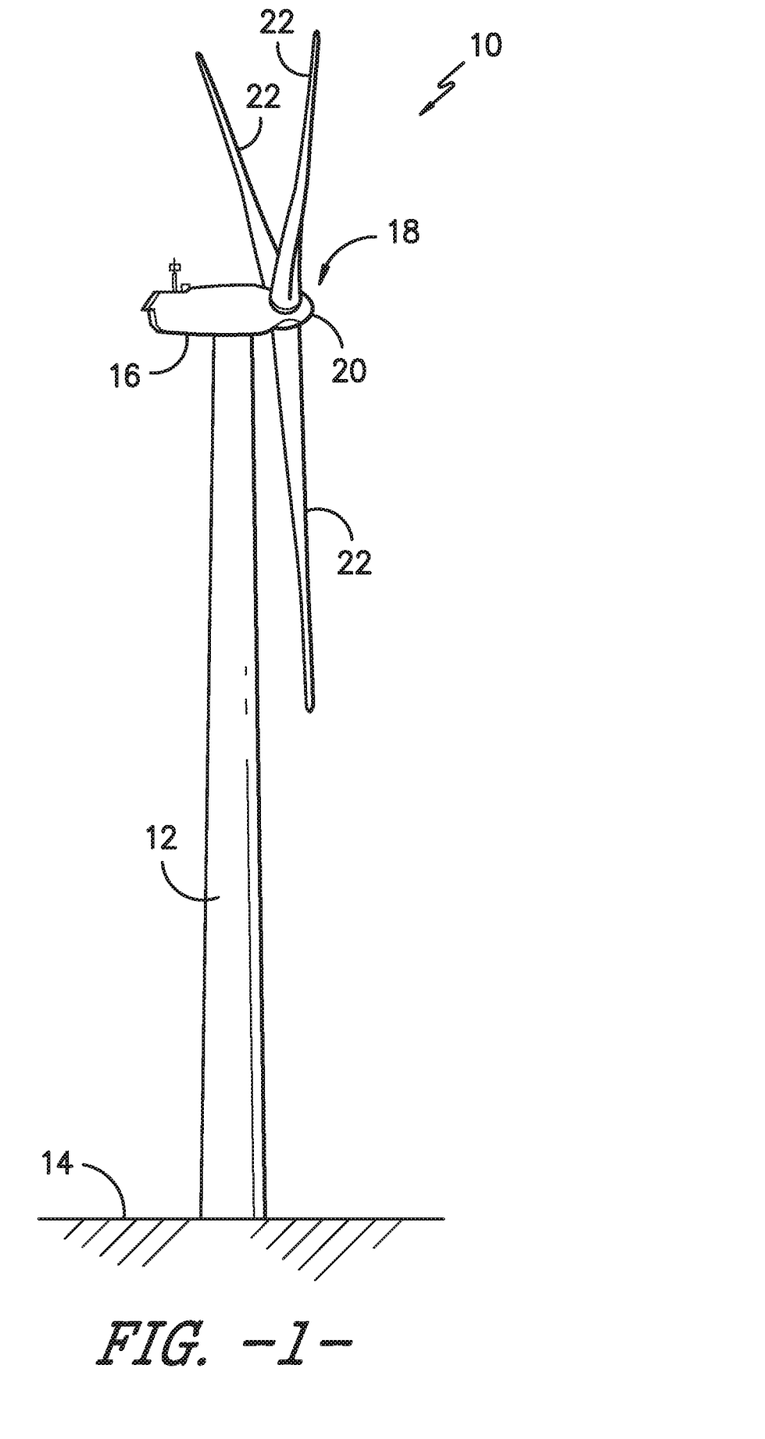
FIG. 1 illustrates a perspective view of a wind turbine according to one embodiment of the present disclosure.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator 25 (FIG. 2) positioned within the nacelle 16 to permit electrical energy to be produced.

Figure 2:
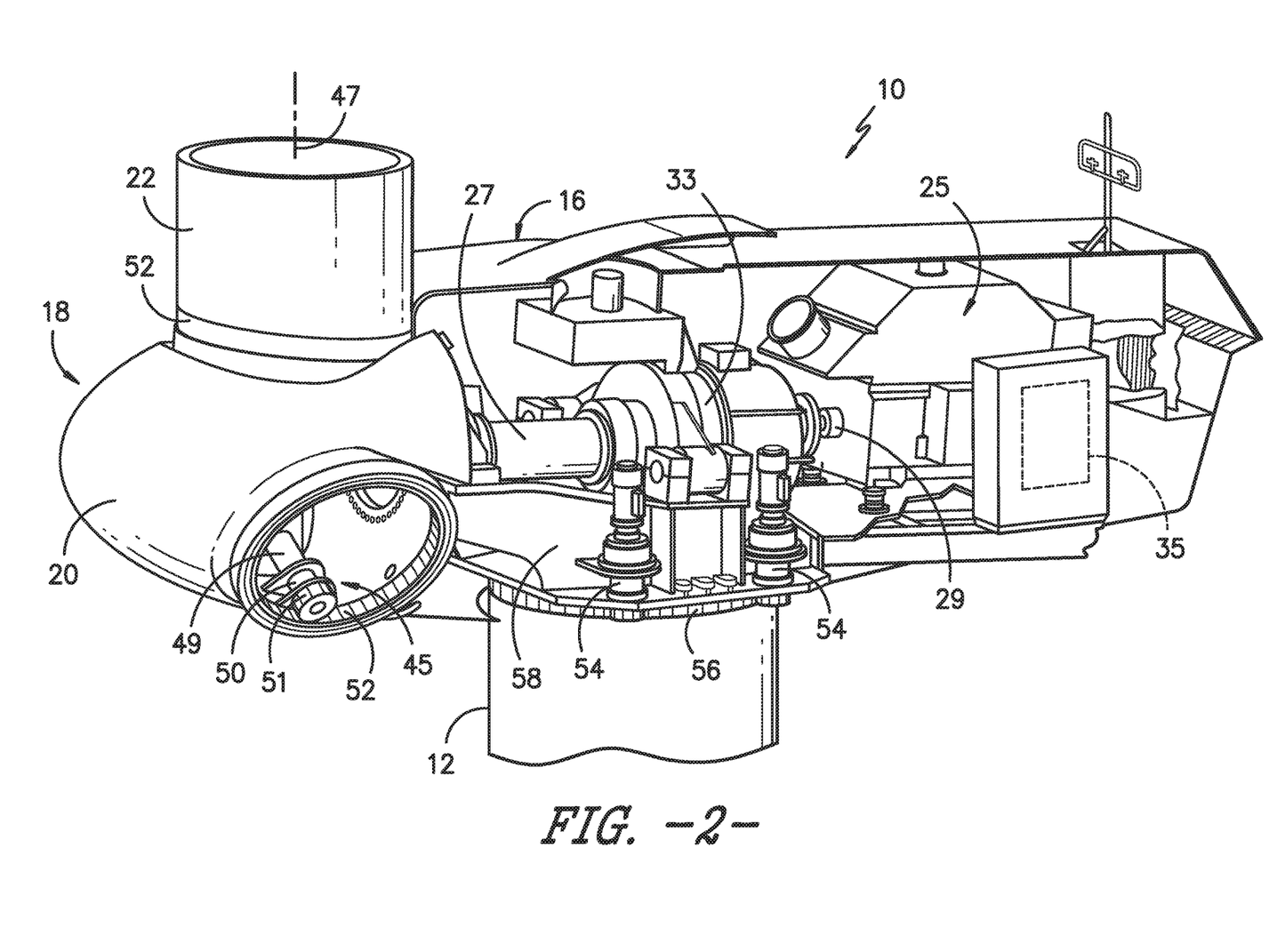
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 25 may be disposed within the nacelle 16. In general, the generator 25 may be coupled to the rotor 18 for producing electrical power from the rotational energy generated by the rotor 18. For example, as shown in the illustrated embodiment, the rotor 18 may include a rotor shaft 27 coupled to the hub 20 for rotation therewith. The rotor shaft 27 may, in turn, be rotatably coupled to a generator shaft 29 of the generator 25 through a gearbox 33. As is generally understood, the rotor shaft 27 may provide a low speed, high torque input to the gearbox 33 in response to rotation of the rotor blades 22 and the hub 20. The gearbox 33 may then be configured to convert the low speed, high torque input to a high speed, low torque output to drive the generator shaft 29 and, thus, the generator 25.

The wind turbine 10 may also include a controller 35 centralized within the nacelle 16. Alternatively, the controller 35 may be located within any other component of the wind turbine 10 or at a location outside the wind turbine 10. Further, the controller 35 may be communicatively coupled to any number of the components of the wind turbine 10 in order to control the operation of such components and/or implement various correction actions as described herein.

Still referring to FIG. 2, each rotor blade 22 may also include a pitch drive mechanism 45 configured to rotate each rotor blade 22 about its pitch axis 47. Further, each pitch drive mechanism 45 may include a pitch drive motor 49 (e.g., any suitable electric, hydraulic, or pneumatic motor), a pitch drive gearbox 50, and a pitch drive pinion 51. In such embodiments, the pitch drive motor 49 may be coupled to the pitch drive gearbox 50 so that the pitch drive motor 49 imparts mechanical force to the pitch drive gearbox 50. Similarly, the pitch drive gearbox 50 may be coupled to the pitch drive pinion 51 for rotation therewith. The pitch drive pinion 51 may, in turn, be in rotational engagement with a pitch bearing 52 coupled between the hub 20 and a corresponding rotor blade 22 such that rotation of the pitch drive pinion 51 causes rotation of the pitch bearing 52. Thus, in such embodiments, rotation of the pitch drive motor 49 drives the pitch drive gearbox 50 and the pitch drive pinion 51, thereby rotating the pitch bearing 52 and the rotor blade 22 about the pitch axis 47. Similarly, the wind turbine 10 may include one or more yaw drive mechanisms 54 communicatively coupled to the controller 35, with each yaw drive mechanism(s) 54 being configured to change the angle of the nacelle 16 relative to the wind (e.g., by engaging a yaw bearing 56 of the wind turbine 10).

Figure 3:
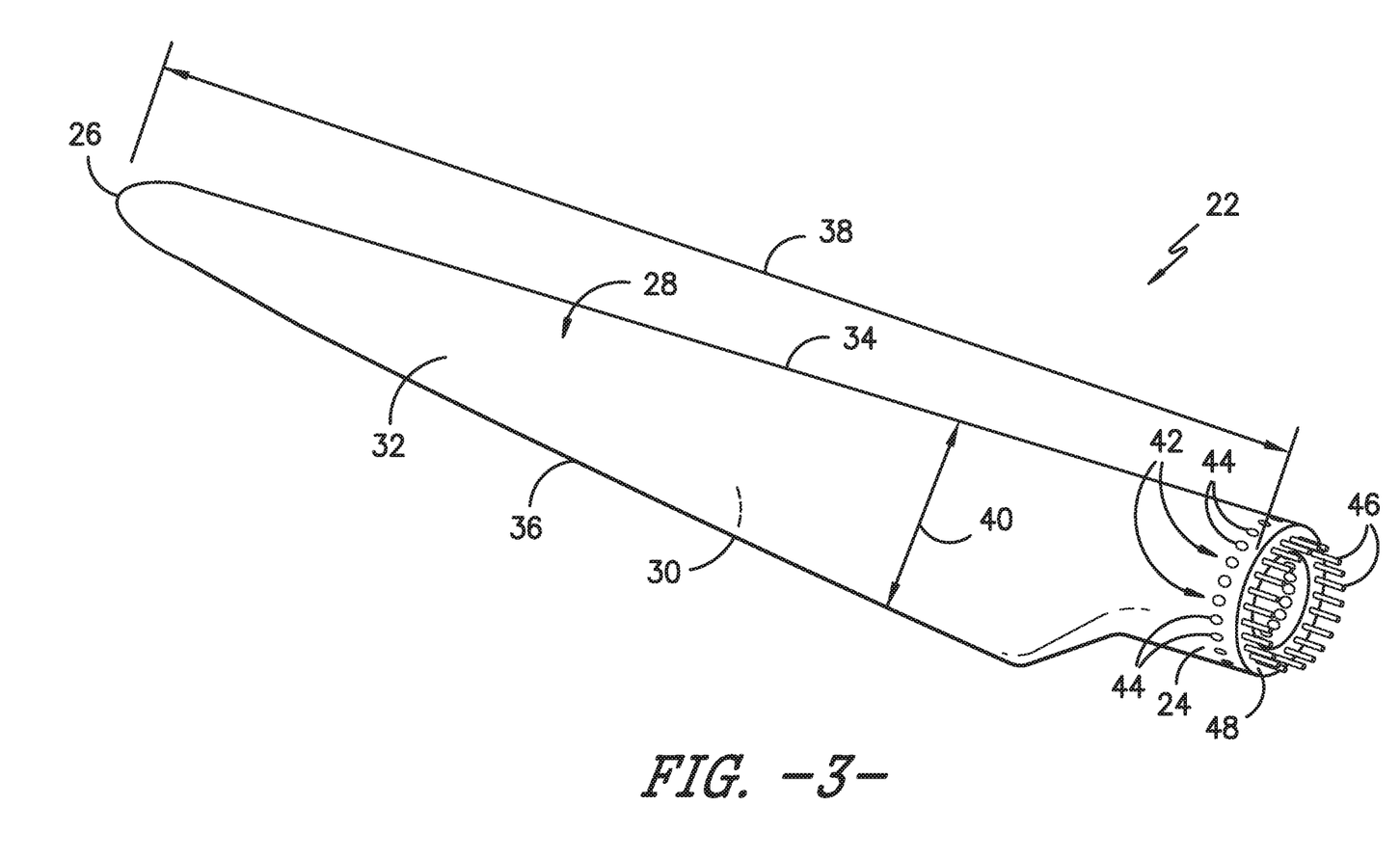
FIG. 3 illustrates a perspective view of a rotor blade according to one embodiment of the present disclosure.

Referring now to FIG. 3, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 (FIG. 1) and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 29 extends from the blade root 24 to the blade tip 26.

Moreover, as shown in FIG. 2, the rotor blade 22 may also include a plurality of T-bolts or root attachment assemblies 42 for coupling the blade root 22 to the hub 20 of the wind turbine 10. In general, each root attachment assembly 42 may include a barrel nut 44 mounted within a portion of the blade root 24 and a root bolt 46 coupled to and extending from the barrel nut 44 so as to project outwardly from a root end 48 of the blade root 24. By projecting outwardly from the root end 48, the hub bolts 46 may generally be used to couple the blade root 24 to the hub 20 via one of the pitch bearings 52 of the wind turbine 10. For example, the pitch bearing 52 may define a plurality of bolt holes configured to receive the hub bolts 48.

Various embodiments of methods for suspending one of the rotor blades 22 from the hub 20 of the wind turbine 10, including various system components that may be used in performing such methods, will now be described with reference to FIGS. 4-9. It should also be appreciated that, although the methods will be described herein as being performed in a particular order, the methods may generally be performed in any suitable order that is consistent with the disclosure provided herein.

Referring particularly to FIGS. 4-7, various views of one embodiment of a system 60 for suspending one of the rotor blades 22 uptower according to the present disclosure are illustrated. As shown, various views of the system 60, which includes a support structure 62 for suspending the rotor blade 22 uptower, are illustrated. More specifically, as shown, the support structure 62 may include, at least, a first support structure arm 75 and a second support structure arm 77. Each of the first and second support structure arms 75, 77 also have a first end 64 and a second end 66. Further, as shown particularly in FIG. 7, the first end(s) 64 includes a hinge point 65 for securing to a first uptower location 67 of the wind turbine 10. Moreover, the second end(s) 66 of the first and second support structure arms 75, 77 is configured to receive and secure the rotor blade 22 thereto. For example, as shown in FIGS. 4-7 and 9, the second end(s) 66 of the first and second support structure arms 75, 77 may include a clamp member 68 attached thereto for receiving and holding the rotor blade 22 therein.

Figure 4:
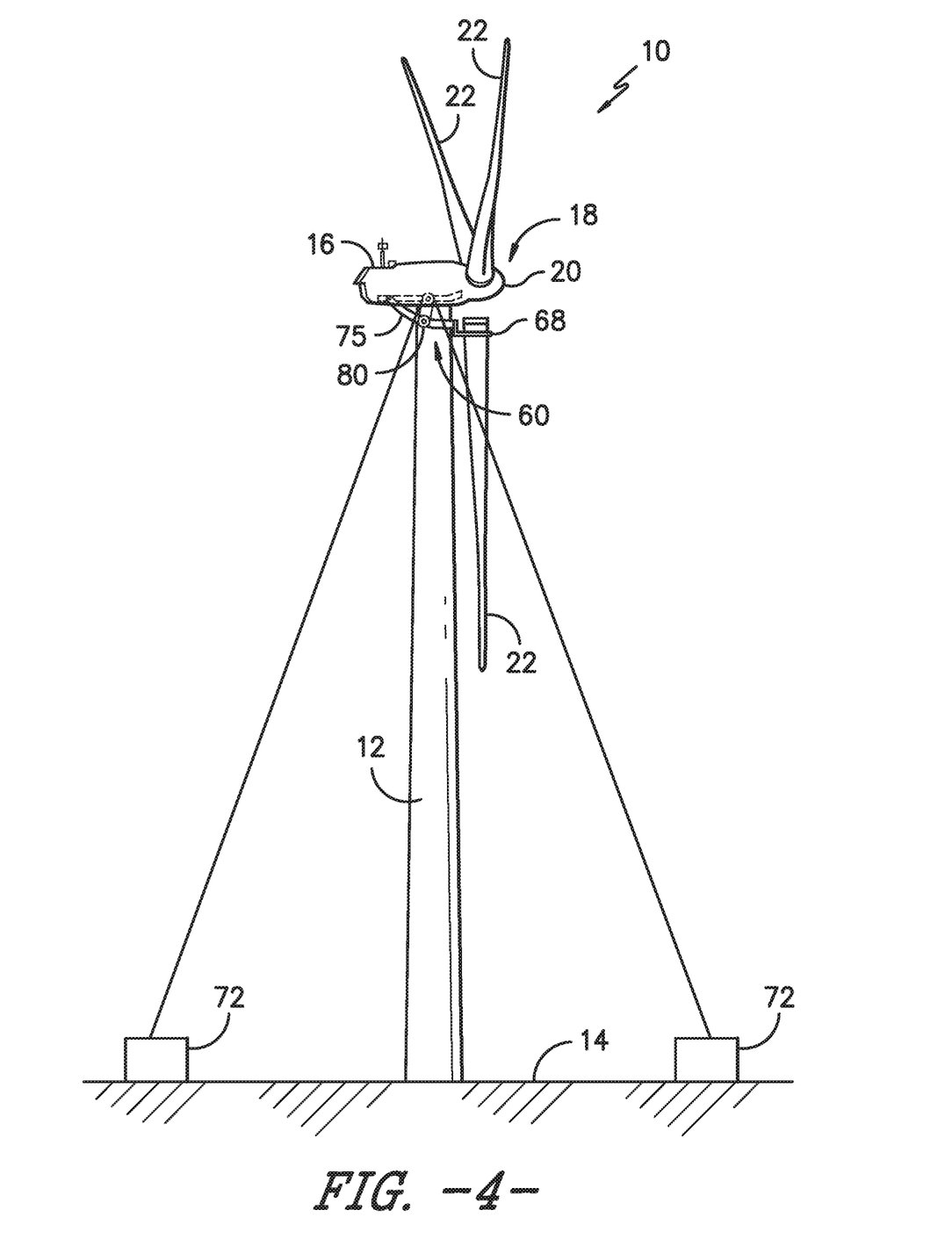
FIG. 4 illustrates a perspective view of another embodiment of a wind turbine, particularly illustrating one of the rotor blades suspended uptower via the support structure according to the present disclosure.
Figure 5:
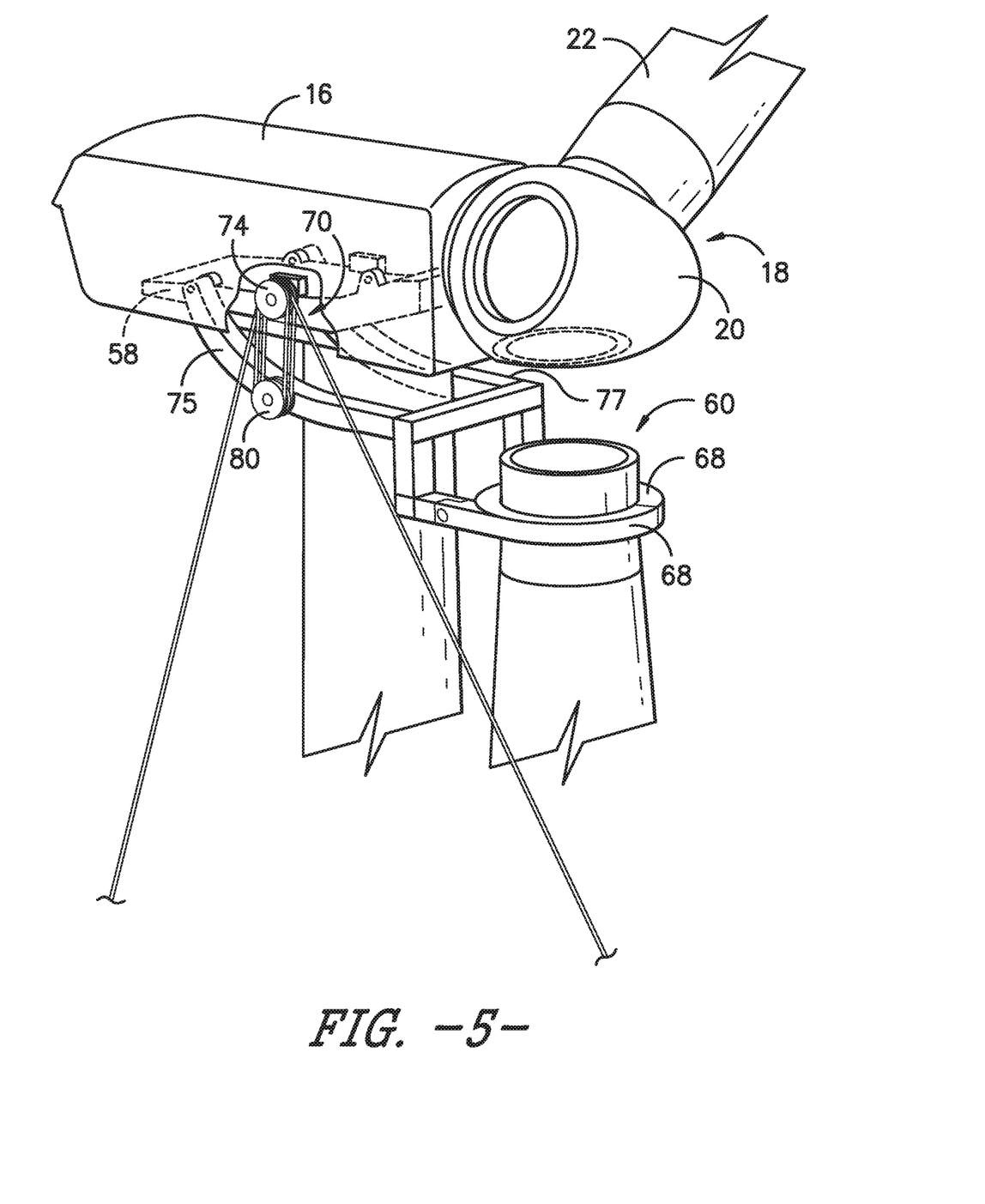
FIG. 5 illustrates turbine detailed view of the wind turbine of FIG. 4, particularly illustrating one of the rotor blades suspended uptower via the support structure according to the present disclosure.
Figure 6:
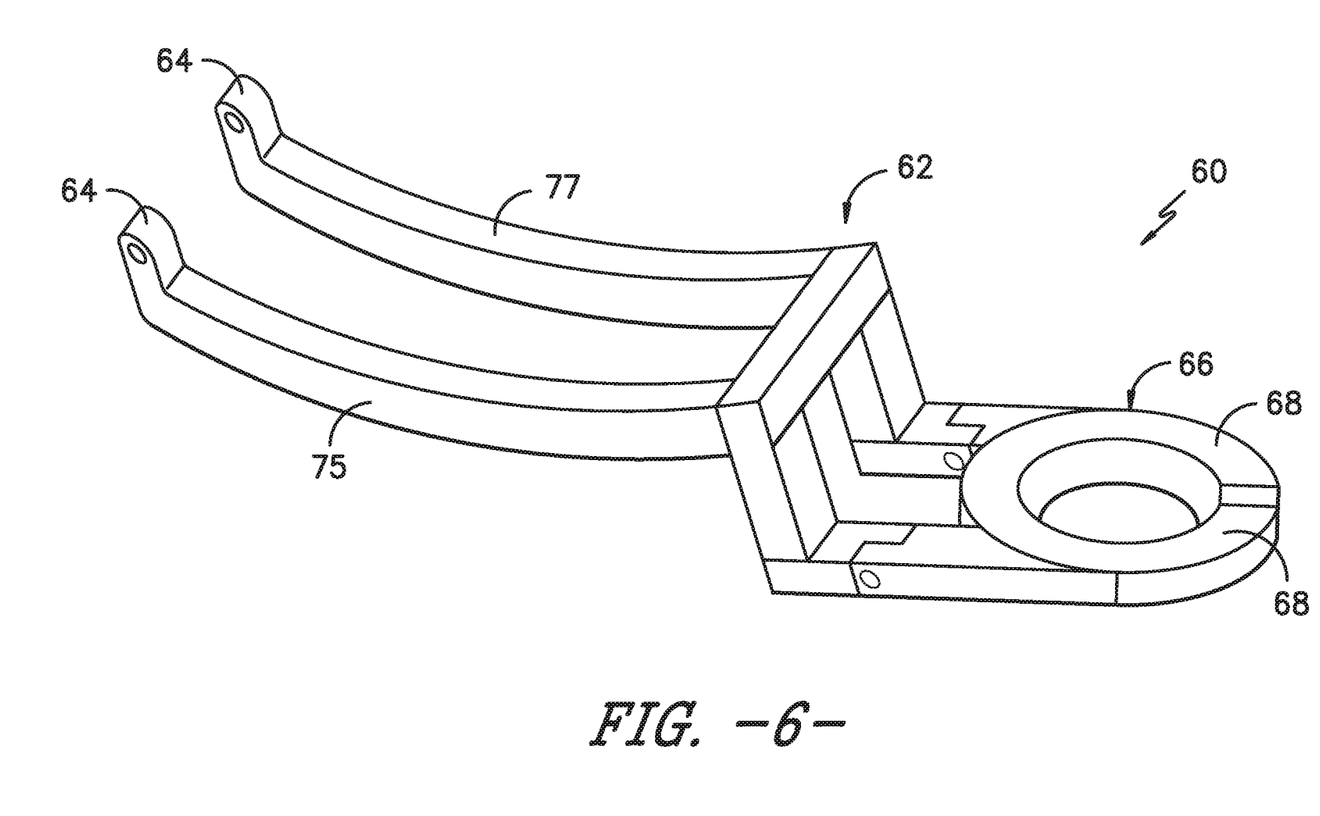
FIG. 6 illustrates a perspective view of one embodiment of the support structure according to the present disclosure.
Figure 7:
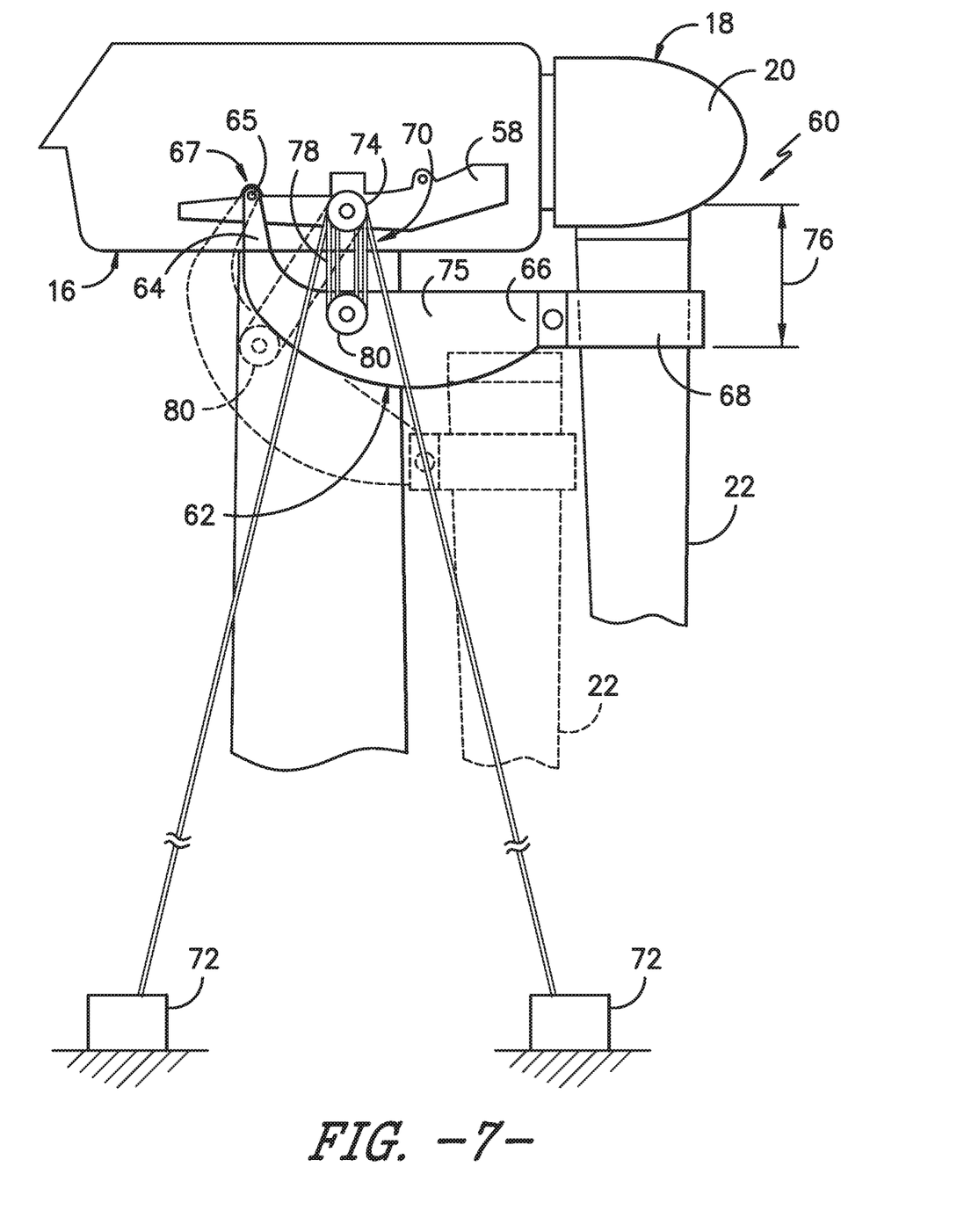
FIG. 7 illustrates a side view of one embodiment of a nacelle of a wind turbine, particularly illustrating one of the rotor blades suspended uptower via the support structure according to the present disclosure.

Referring particularly to FIGS. 4, 5, and 6, the system 60 also includes at least one pulley block assembly 70 mounted between the first uptower location 67 and the support structure 62. For example, in certain embodiments, the system 60 may include first and second pulley block assemblies 70 on opposing sides of the bedplate 58. Moreover, the system 60 includes at least one winch 72 and at least one pulley cable 74 routed from the winch(es) 72 over the pulley block assembly(ies) 70. More specifically, as shown in FIG. 7, each of the pulley block assembly(ies) 70 may each include at least one first pulley block 78 mounted on the bedplate 58 of the wind turbine 10 and at least one second pulley block 80 mounted to the support structure 62 (e.g. one on each of the support structure arms 75, 77).

Figure 8:
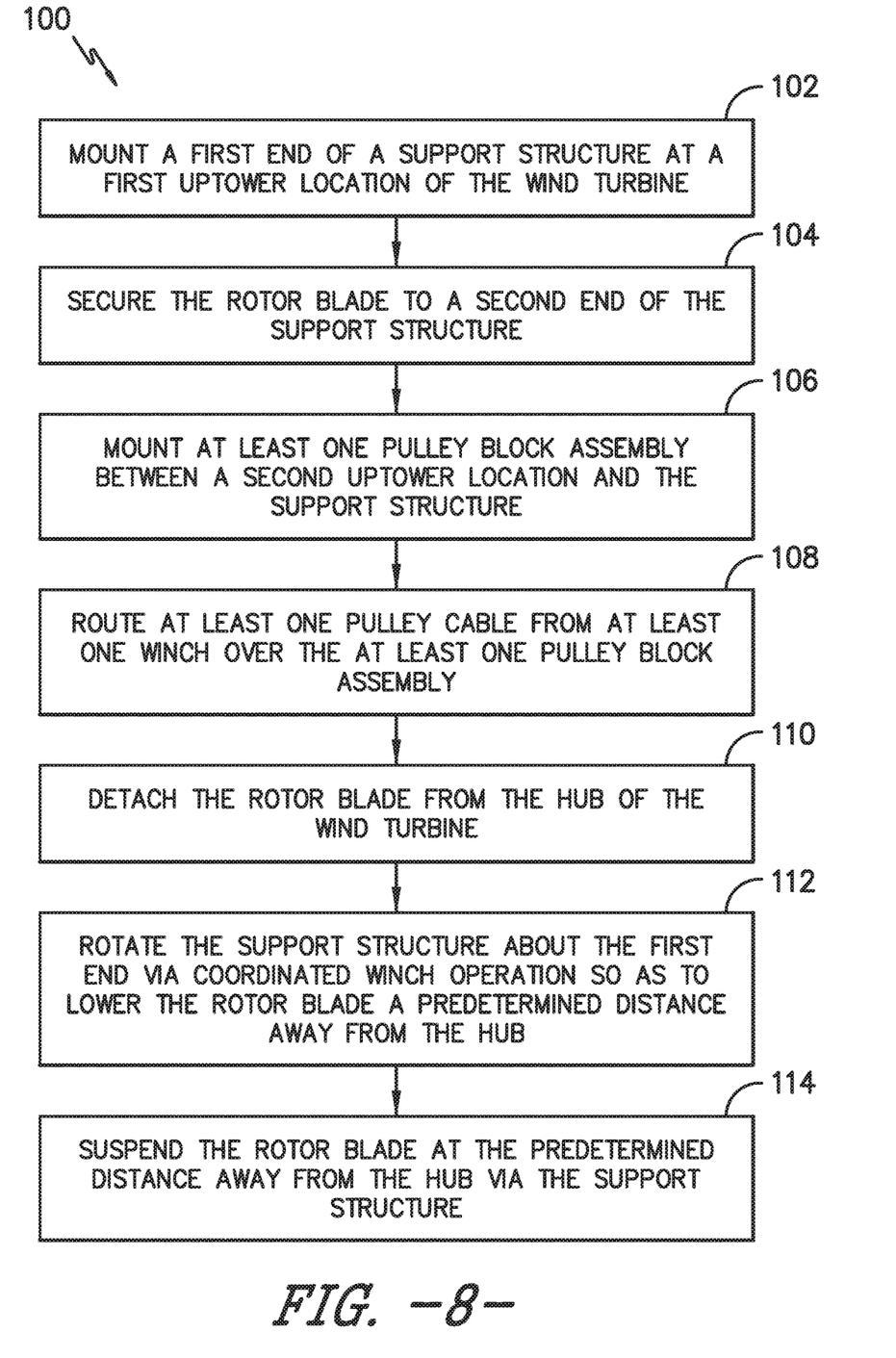
FIG. 8 illustrates a flow diagram of one embodiment of a method for suspending a rotor blade uptower via the support structure according the present disclosure.

Thus, as shown in FIG. 8, a flow diagram of one embodiment of a method 100 for suspending a rotor blade 22 uptower via the support structure 62 according the present disclosure is illustrated. Generally, the rotor blade 22 to be detached and suspended is generally positioned in a vertical orientation relative to the support surface 14 of the wind turbine 10. More specifically, as shown, the rotor blade 22 is positioned vertically downward from the hub 20 in approximately a six o'clock position such that the blade tip 26 of the rotor blade 22 is pointing towards the support surface 14. It should be appreciated that, due to a tilt angle and/or cone angle of the wind turbine 10, the rotor blade 22 may be angled slightly away from the tower 12 when moved to the vertically downward position.

Figure 9:
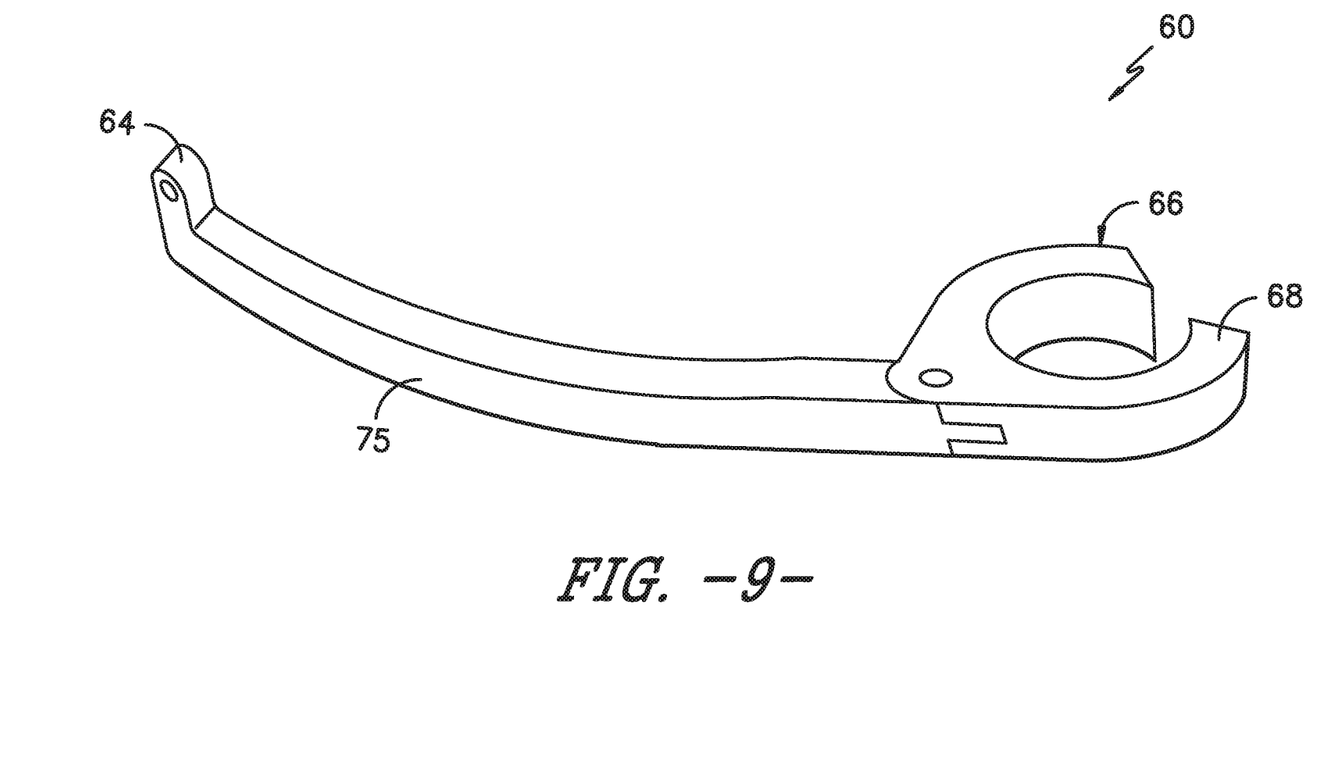
FIG. 9 illustrates a perspective view of another embodiment of the support structure according to the present disclosure.

Further, as shown at 102, the method 100 includes mounting the first end 64 of the support structure 62 at the first uptower location 67 of the wind turbine 10. More specifically, as shown in FIGS. 4, 5, and 6, the method 100 may include mounting first ends of the first and second support structure arms 75, 77 to opposing sides of the bedplate 58. As shown at 104, the method 100 includes securing the rotor blade 22 to a second end 66 of the support structure 62. More specifically, as shown in FIGS. 4-6 and 8, the method 100 may include securing the rotor blade 22 to the second end 66 of the support structure 62 via one or more clamp members 68. FIGS. 6 and 9 illustrate perspective views of different embodiments of the clamp members 68, though it should be understood by those of ordinary skill in the art that the clamp members 68 may have any suitable configuration so as to receive and suspend the rotor blade 22 in place.

As shown at 106, the method 100 includes mounting at least one pulley block assembly 70 between a second uptower location 69 and the support structure 62. As shown at 108, the method 100 includes routing at least one pulley cable 74 from at least one winch 70 over the at least one pulley block assembly 70. In several embodiments, the first and second uptower locations 67, 69 may be located on the bedplate 58 of the wind turbine 10. Alternatively, the first and second uptower locations 67, 69 may be located at any suitable location within or outside of the nacelle 16 of the wind turbine 10. Thus, as shown in FIG. 7, the method 100 may include mounting the first end 64 of the support structure 62 to the bedplate 58 at the hinge point 65.

As shown at 110, the method 100 includes detaching the rotor blade 22 from the hub 20 of the wind turbine 10. In particular embodiments, the rotor blade 22 may be detached from the hub 20 with or without the pitch bearing 52 still attached thereto. If the pitch bearing 52 remains attached, the pitch bearing replacement process can be expedited because the rotor blade 22 and the pitch bearing 52 are detached from the hub 20 at the same time and the bearing removal from the rotor blade 22 can occur on the ground. Removing the pitch bearing 52 from the blade 22 on the ground can be safer than uptower and can occur in parallel with the bearing installation process to the hub 20.

Once the rotor blade 22 is detached, as shown at 112, the method 100 includes rotating the support structure 62 about the first end 64 via coordinated winch operation so as to lower the rotor blade 22 a predetermined distance 76 away from the hub 20. More specifically, in one embodiment, the method 100 may include rotating the support structure 62 about the hinge point 65 via coordinated winch operation so as to lower the rotor blade 22 the predetermined distance 76 away from the hub 20. In addition, as shown in FIG. 6, such rotation also brings the rotor blade 22 closer to the tower 12. More specifically, as shown in illustrated embodiment of FIG. 7, when the support structure 62 rotates about the hinge point 65, the rotor blade 22 moves from a first position at the hub 20 to a second position (as indicated in phantom) that is closer to the tower 12 of the wind turbine 10 than the first position. Thus, as shown at 114, the method 100 may further include suspending the rotor blade 22 at the predetermined distance 76 away from the hub 20 via the support structure 62, e.g. during a repair and/or replacement procedure. It should also be understood that the rotor blade 22 may be suspended via the support structure 62 in the first position, the second position, or any position therebetween.

In additional embodiments, the method 100 may include securing the rotor blade 22 to the tower 12 of the wind turbine 10 during suspension, e.g. to mitigate tower strikes by the rotor blade 22. For example, in certain embodiments, the rotor blade 22 may be secured to the tower 12 at the blade root 24 and the blade tip 26 of the rotor blade 22 during suspension thereof via at least one of an additional clamp member, a sleeve, one or more support lines, or combinations thereof.

Figure 10:
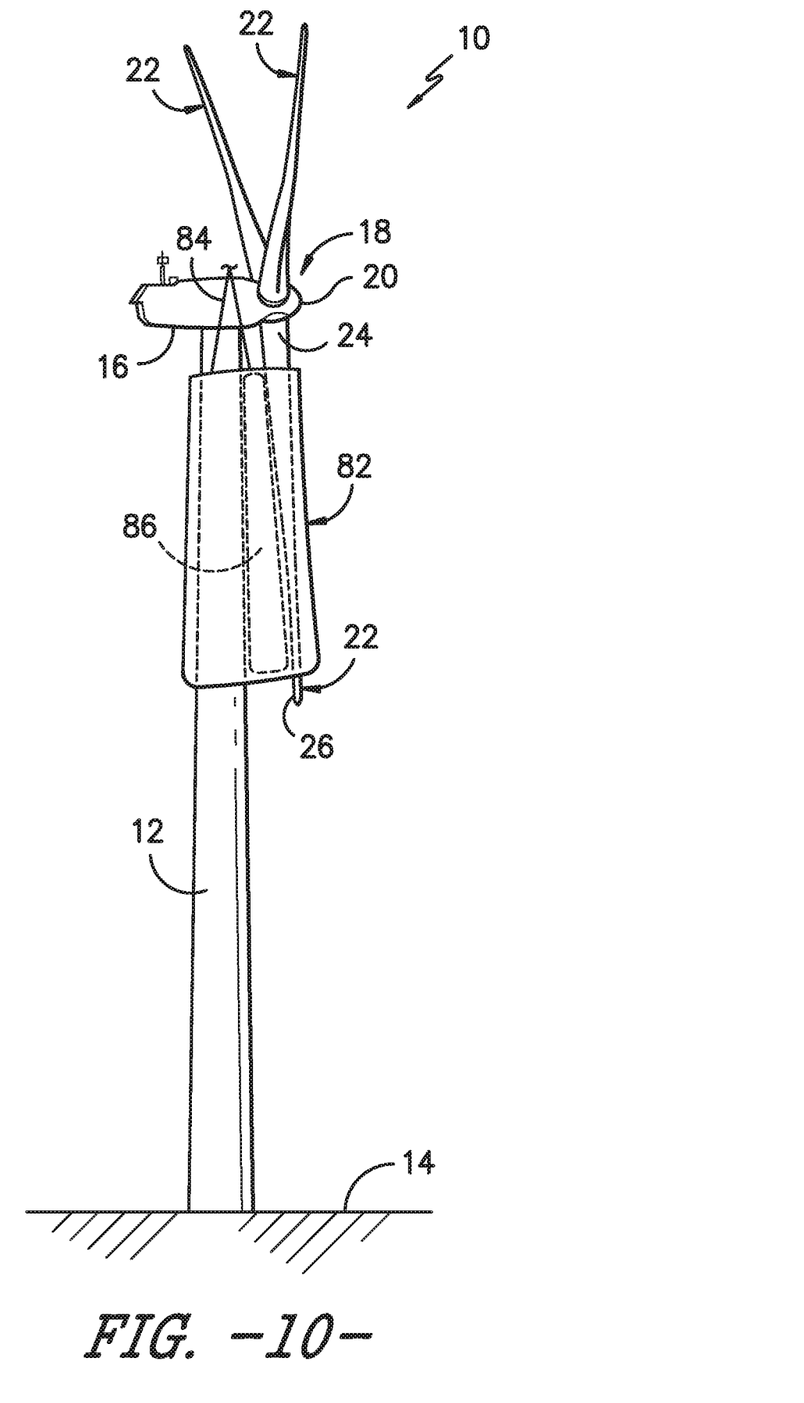
FIG. 10 illustrates a perspective view of another embodiment of a wind turbine, particularly illustrating one of the rotor blades secured to the tower via a blade sleeve according to the present disclosure.

More specifically, as shown in FIG. 10, the rotor blade 22 is secured to the tower 12 via an optional blade sleeve 82 that is held in place via support lines 84. More specifically, as shown, the blade sleeve 82 extends continuously between the blade root 24 and the blade tip 26. In alternative embodiments, as shown in FIG. 12, the rotor blade 22 may be secured to the tower 12 via a plurality of sleeves 82, i.e. one at the blade root 24 and one at the blade tip 26, rather than continuously from the blade root 24 to the blade tip 26.

Figure 11:
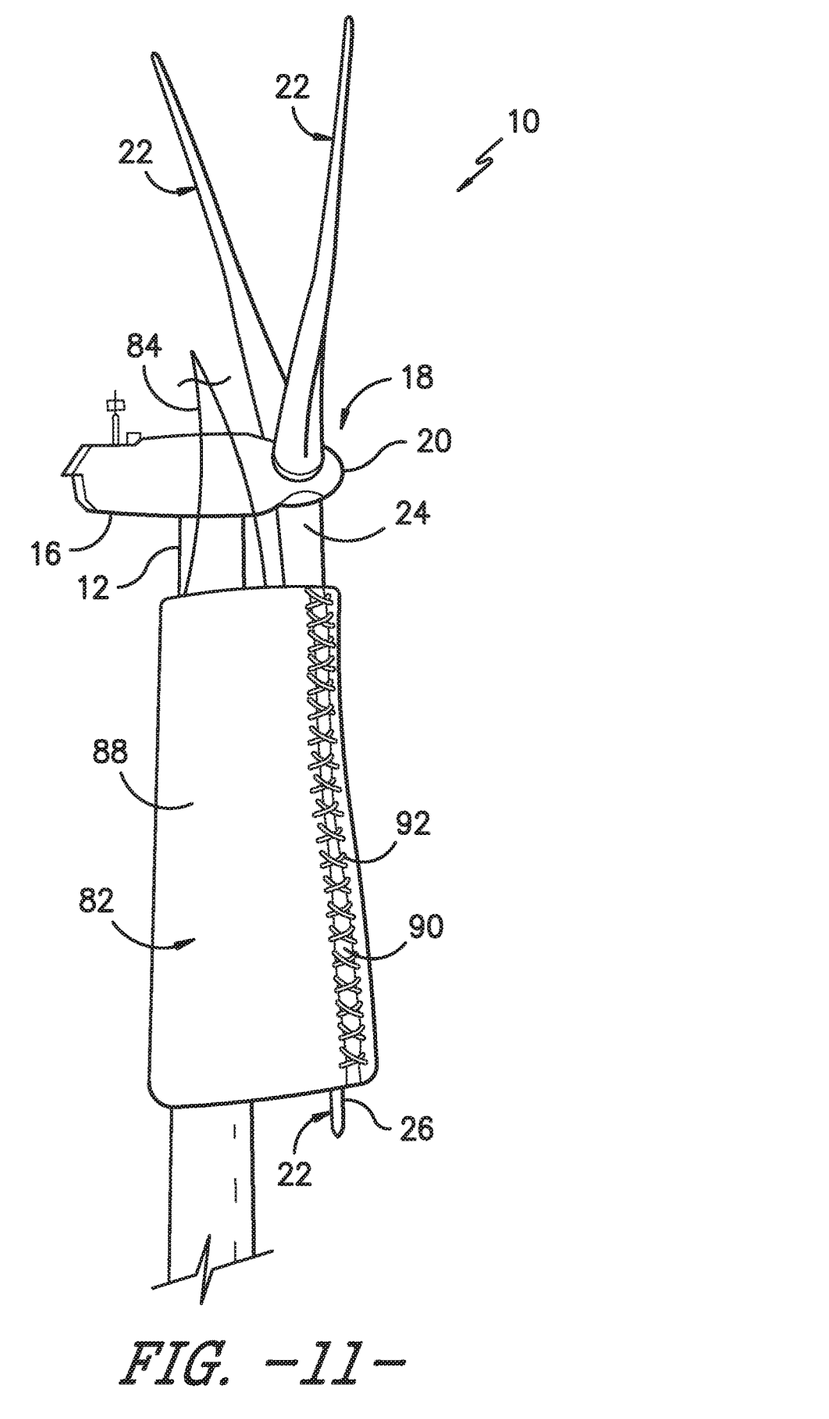
FIG. 11 illustrates a detailed, perspective view of the wind turbine of FIG. 10.

Further, as shown in FIGS. 9-11, the blade sleeve 82 may be wrapped around the rotor blade 22 and the tower 12 so as to restrict movement of the rotor blade 22 during suspension thereof. More specifically, as shown particularly in FIG. 10, the sleeve 82 may correspond to a fabric material 88 that is split along at least one split line 90 such that the material 88 can be easily wrapped around the rotor blade 22 and the tower 12 and then secured back together, e.g. via laces, buttons, a ratchet strap, an adhesive, tape, and/or a zipper). For example, as shown in FIG. 10, the fabric material 88 is secured around the rotor blade 22 via laces 92 configured along the split line 90 that are tied together.

Figure 12:
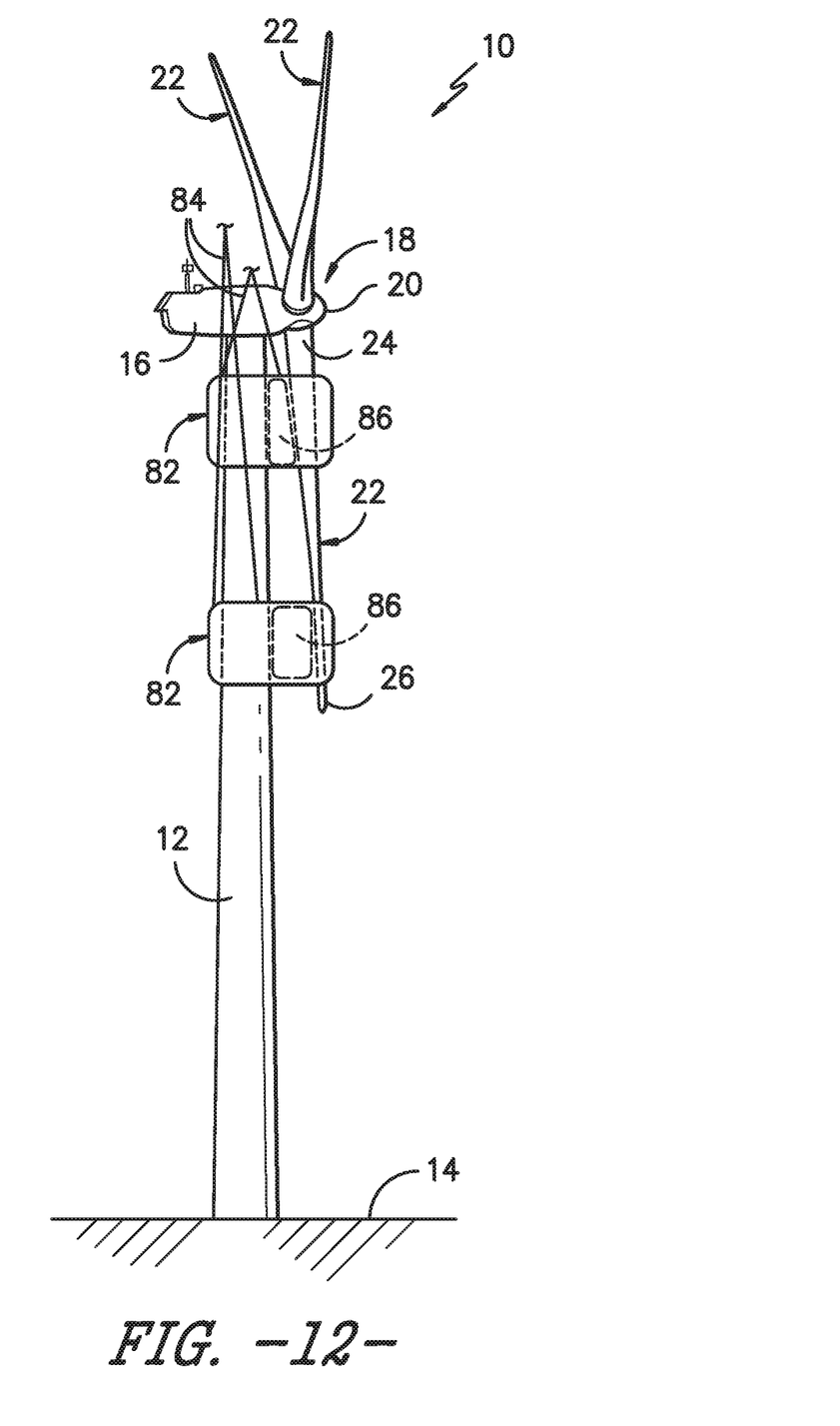
FIG. 12 illustrates a perspective view of another embodiment of a wind turbine, particularly illustrating one of the rotor blades secured to the tower via a plurality of blade sleeves according to the present disclosure.

In addition, as shown in FIGS. 10-12, the blade sleeve(s) 82 may house at least one cushion component 86 between the tower 12 and the rotor blade 22. Thus, as shown, the cushion component(s) 86 may act as an airbag that is configured to conform to the rotor blade 22 and/or the tower 12 to provide support over a large surface area to prevent crushing of the rotor blade 22 and/or the tower 12.

Still referring to FIGS. 10-12, one or more support lines 84 may be secured to the blade sleeve(s) 82 and may extend upward to an up-tower location, such as at a location on and/or within the hub 20 or the nacelle 16. For instance, in one embodiment, the support line(s) 84 may extend upward from the blade sleeve(s) 82 to personnel located within and/or on top of the hub 20 or the nacelle 16. Regardless, the support line(s) 84 may be used to lift the blade sleeve(s) 82 vertically upwards relative to the support surface 14 to allow the sleeve 82 to be installed around the rotor blade 22 and the tower 12. It should also be understood by those of ordinary skill in the art that the system and method as described herein can operate without the use of the blade sleeve(s) 82.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for suspending a rotor blade of a wind turbine uptower, the method comprising:
   mounting a first end of a first support structure arm and a first end of a second support structure arm to opposing sides of a bedplate of the wind turbine via respective hinge points;
   securing the rotor blade to second ends of the first and second support structure arms;
   mounting at least one first pulley block on the bedplate and at least one second pulley block to each of the first and second support structure arms;
   routing at least one pulley cable from at least one winch over the at least one pulley block assembly;
   detaching the rotor blade from a hub of the wind turbine;
   rotating the first and second support structures about their respective hinge points via coordinated winch operation so as to lower the rotor blade a predetermined distance away from the hub; and,
   suspending the rotor blade at the predetermined distance away from the hub via the first and second support structure arms.

2. The method of claim 1, further comprising positioning the rotor blade toward a ground location in a substantially six o'clock position.

3. The method of claim 1, wherein detaching the rotor blade from the hub of the wind turbine further comprises detaching the rotor blade from the hub of the wind turbine with a pitch bearing attached thereto.

4. The method of claim 1, further comprising securing the rotor blade to the second ends of the first and second support structure arms via one or more clamp members.

5. The method of claim 1, further comprises providing first and second pulley block assemblies on opposing sides of the bedplate.

6. The method of claim 5, wherein the first and second pulley block assemblies each comprises at least one first pulley block mounted at the second uptower location of the wind turbine and at least one second pulley block mounted to the first and second support structure arms.

7. The method of claim 1, wherein rotating the support structure about the first uptower location via coordinated winch operation so as to lower the rotor blade the predetermined distance away from the hub further comprises lowering the rotor blade from a first position at the hub to a second position that is closer to a tower of the wind turbine than the first position.

8. The method of claim 7, further comprising securing the rotor blade to the tower of the wind turbine at a blade root and a blade tip of the rotor blade during suspension thereof via at least one of a clamp member, a sleeve, one or more support lines, or combinations thereof.

\* \* \* \* \*